United States Patent [19]

Kawabata

[11] 4,269,808
[45] May 26, 1981

[54] METHOD OF SIMULTANEOUSLY SUBJECTING ORES TO PULVERIZATION AND LEACHING OR EXTRACTION

[75] Inventor: Shigekatsu Kawabata, Tokyo, Japan

[73] Assignees: Seika Sangyo Co., Ltd.; Japan Tower Miller Co., Ltd., both of Tokyo, Japan

[21] Appl. No.: 65,051

[22] Filed: Aug. 9, 1979

[51] Int. Cl.³ ............................................. C22B 3/00
[52] U.S. Cl. .................................... 423/1; 423/20; 423/31; 423/658.5; 423/DIG. 15; 241/20; 241/21; 241/24; 241/46 R
[58] Field of Search .......... 423/1, 31, 658.5, DIG. 15, 423/20; 241/46 R, 46.17, 20, 21, 24

[56] References Cited

U.S. PATENT DOCUMENTS

| | | | |
|---|---|---|---|
| 1,156,382 | 10/1915 | Towne | 423/31 |
| 1,193,197 | 8/1916 | Smith | 423/31 |
| 2,390,898 | 12/1945 | Rechtin | 241/46 R |
| 2,903,191 | 9/1959 | Rietz | 241/46 R |
| 3,185,398 | 5/1965 | Hughes | 241/20 |
| 3,337,140 | 8/1967 | Wohl | 241/21 |
| 3,770,214 | 11/1973 | Gabor | 241/46.17 |
| 3,953,200 | 4/1976 | Lin | 423/DIG. 15 |
| 3,998,938 | 12/1976 | Szegvari | 241/46.17 |

Primary Examiner—Brian E. Hearn
Attorney, Agent, or Firm—Kerkam, Stowell, Kondracki & Clarke

[57] ABSTRACT

There is provided a method for simultaneously carrying out pulverization of ores and their leaching or extraction within a vertical abrasion mill.

5 Claims, 1 Drawing Figure

METHOD OF SIMULTANEOUSLY SUBJECTING ORES TO PULVERIZATION AND LEACHING OR EXTRACTION

DETAILED DESCRIPTION OF THE INVENTION

The present invention relates to methods for recovering effective components from ores.

A conventional method comprises two steps of pulverizing ores and subsequently, subjecting the pulverized ores to leaching or extraction. An object of the present invention is to provide a method for carrying out these operations in one step to reduce the leaching or extraction time.

This object is achieved by providing a method in which ores are subjected simultaneously to pulverization and leaching or extraction within a vertical abrasion mill. The method according to the invention can be utilized to subject uranium ores to leaching and gold ores to extraction.

BRIEF DESCRIPTION OF THE DRAWING

The accompanying drawing is a longitudinal sectional view of an example of a wet vertical abrasion mill used to practice the method of the present invention.

The wet vertical abrasion mill will now be described with reference to the drawing.

Figure 1:
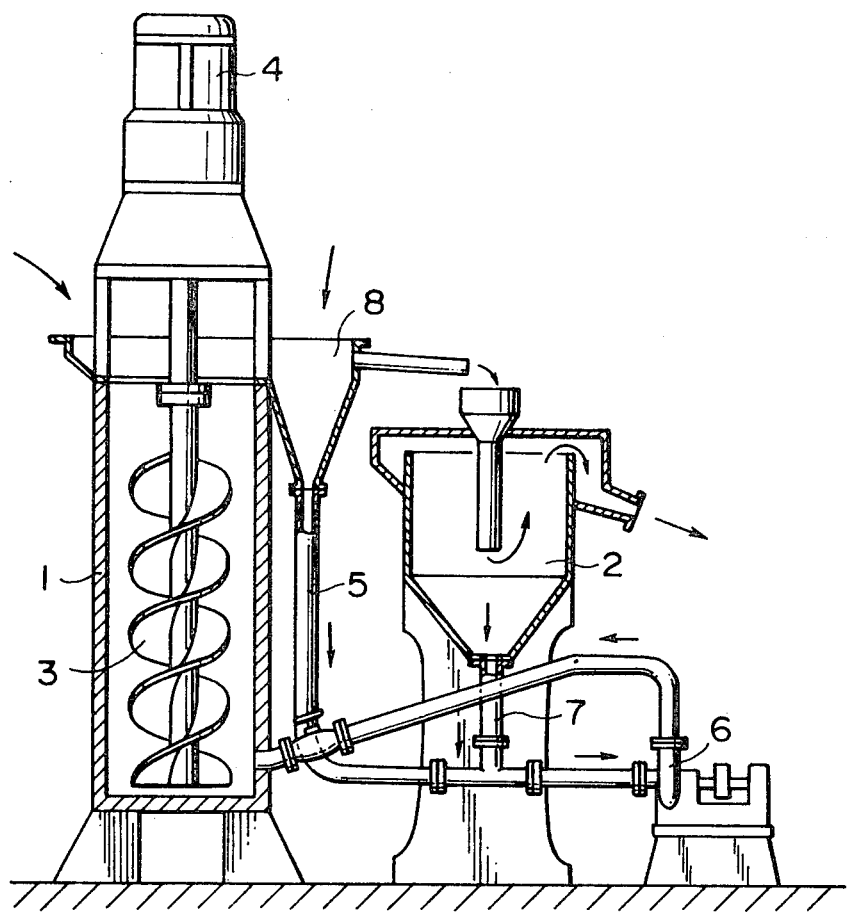

This mill consists of a cylindrical tower shell 1 and an elutriation device 2.

The operation of the mill will be described referring to a case where uranium ore is simultaneously pulverized and leached.

The tower shell 1 is filled with dilute sulfuric acid, and uranium ore having a size as large as 20 mm is placed in the tower shell 1 as pulverizing medium. A screw 3 in the tower shell 1 is then rotated by drive means 4 provided on the tower shell 1. Uranium ore having a particle size of −3 mm is charged into the tower shell 1 to be pulverized by the grinding effect of the screw 3. The pulverized particles overflow with the dilute sulfuric acid from the tower shell 1 to enter the elutriation device 2 via a receiver 8. Larger particles are sucked from the receiver 8 into a sand pump 6 via a pipe 5 so as to be returned to the tower shell 1 wherein the larger particles are again subjected to pulverization and leaching. The larger particles contained in the pulverized product which has advanced into the elutriation device 2 are precipitated at the bottom portion of the elutriation device 2 and sucked by the sand pump 6 to also be returned to the tower shell 1 wherein the larger particles are again subjected to pulverization and leaching. Pulverized particles are withdrawn by an overflow from the water separator. The results obtained by the method according to the present invention will be shown in the following table in comparison wih those obtained by a conventional method in which uranium ore is pulverized by a ball mill to be subsequently subjected to leaching with dilute sulfuric acid.

| Comparison between ball mill and wet vertical abrasion mill | | |
|---|---|---|
| | Ball mill | vertical abrasion mill |
| Dimensions (mm) | 600φ × 200h | 400φ × 2000h |
| Apparatus motive power (kw) | 2.2 | 3.7 |
| Notive power of peripheral equipment (kw) | 0.75 | 2.2 |
| Weight of pulverizing medium (kg) | 250 (Iron balls) | 230 (Equivalent of left) |
| Particle size of ore to be treated (mm) | −3 | −3 |
| Amount of −200 mesh particles obtained per 1kg of ore (T/kwh) | 0.006–0.0011 | 0.020–0.021 |
| Power consumed for the production of pulverized −200 mesh particles (kwh) | 95.6–169.9 | 48.8–50.1 |
| Pulverizing efficiency (−200 mesh) (%) | 9.3–15.1 | 60.3–72.5 |
| Leaching rate (%) | 60 | 82–92 |
| Leaching time (hr) | 72 | 0.25–0.5 |

As is clear from the above, the pulverizing capacity of a vertical abrasion mill is 4–7.8 times that of a ball mill. The leaching rate with the ball mill is 60% recorded after leaching pulverized uranium ore in a leaching vessel for 72 hours. On the other hand, the leaching rate with a vertical abrasion mill, in which uranium ore is subjected to pulverization and leaching at once, is 82% after conducting the operation for 15 minutes, and not less than 92% after conducting the operation for 30 minutes. Namely, the operation with a vertical abrasion mill can be carried out in a very short period of time which is 1/288 of the time necessary to carry out the operation using the ball mill. The leaching rate with the vertical abrasion mill is 1.3 times that with the ball mill. Accordingly, the overall rate of operation of the vertical abrasion mill is 374 times that of the ball mill. The rate of operation in which the leaching of ores is carried out simultaneously with the puvelrization thereof is extremely high.

A process for simultaneously subjecting gold ore to pulverization and extraction using a cyaniding liquid will now be described.

Iron balls are placed in a tower shell 1 of a wet pulverizer as a pulverizing medium. NaCN having a concentration of 0.03–0.04% and CaO having a concentration of 0.02–0.03% are then fed into the tower shell as a pulverizing liquid. A screw 3 in the tower shell 1 is rotated by drive means 4, and gold ore is fed into the liquid.

The gold ore fed into the tower shell 1 is pulverized by the iron balls and overflows from the upper end of the tower shell into a receiver 8. Larger particles are sucked by a sand pump 6 via a pipe 5 and returned to the tower shell. The pulverization and extraction are thus repeatedly carried out in the above manner. In the meantime, larger particles contained in the pulverized particles which have flowed into the elutriation 2 via a receiver 8 are sucked by a sand pump 6 via a pipe 7 and returned to the tower shell 1 for a repeat of pulverization and extraction.

The pulverized particles are subjected to extraction while they are withdrawn as they overflow from the upper portion of the elutriation device 2. The assay of gold ore charge to be pulverized is Au 6.15 g/t, and the assay of tailings 20 minutes after the pulverization and extraction have been simultaneously carried out is Au 0.67 g/t. The assay of gold ore charge and assay of tailings in a conventional method in which the pulverization and extraction are carried out in two steps are Au 6.15 g/t and Au 1.5 g/t, respectively. The extraction in an extraction vessel used in a conventional method requires 6 hours, while the extraction time required in the method according to the present invention, in which ore is subjected to pulverization and extraction simultaneously in a vertical abrasion mill is shortened to 1.18 of the time. In addition, the method according to the present invention permits producing an increased amount of gold at a highly improved efficiency.

I claim:

1. A process of treating ore, comprising the steps of:
   (a) filling a shell of a vertical abrasion mill with an ore and a liquid solution, a mixture thereby being formed,
   (b) pulverizing the ore into particles in the solution by circulating the ore in a generally vertical direction through said shell,
   (c) obtaining an overflow stream from the mixture of the ore and the liquid solution,
   (d) separating said overflow stream into a part containing larger particles and a part containing smaller particles, the part containing larger particles being recirculated to the shell and separating the part containing smaller particles into two subparts, a first subpart containing the larger of these particles and a second subpart containing the smaller of these particles, wherein the solution performs leaching or extraction during the pulverizing step.

2. The process of claim 1, wherein the first subpart is recirculated to the shell.

3. The process of claim 2, wherein the separation of the part containing smaller particles into the two subparts is performed by a elutriation device.

4. The process of claim 3, wherein the first subpart and the part containing the larger particles are merged together in a stream and passed through a pump in order to recirculate the merged stream back to the shell.

5. The process of claim 4, wherein the pulverizing step is carried out by a screw-type impeller.

* * * * *